J. NICKL.
RECOIL LOADING PISTOL.
APPLICATION FILED JUNE 16, 1921.
1,427,966.
Patented Sept. 5, 1922.
5 SHEETS—SHEET 2.
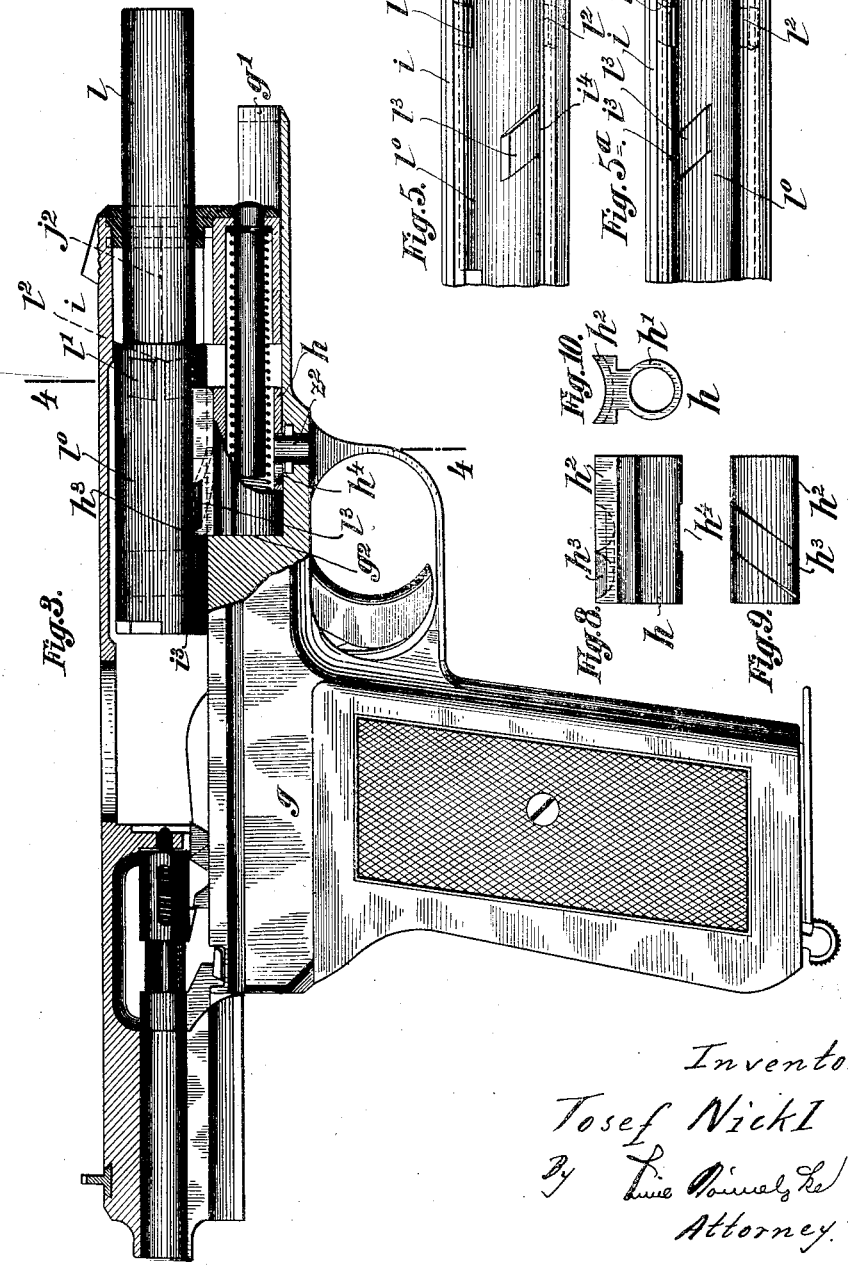
Inventor:
Josef Nickl
By [signature]
Attorney.

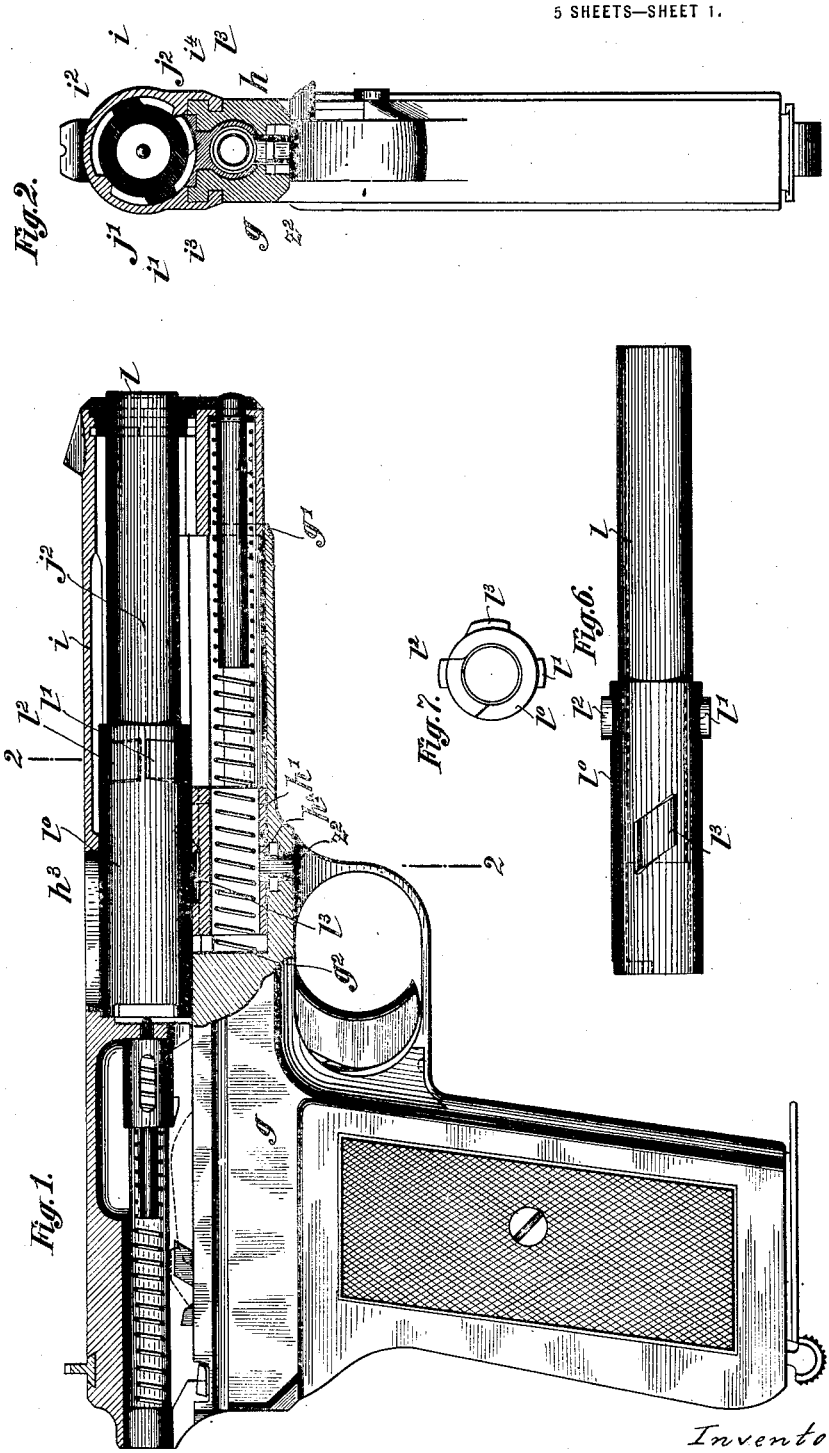

J. NICKL.
RECOIL LOADING PISTOL.
APPLICATION FILED JUNE 16, 1921
1,427,966.
Patented Sept. 5, 1922.
5 SHEETS—SHEET 3.
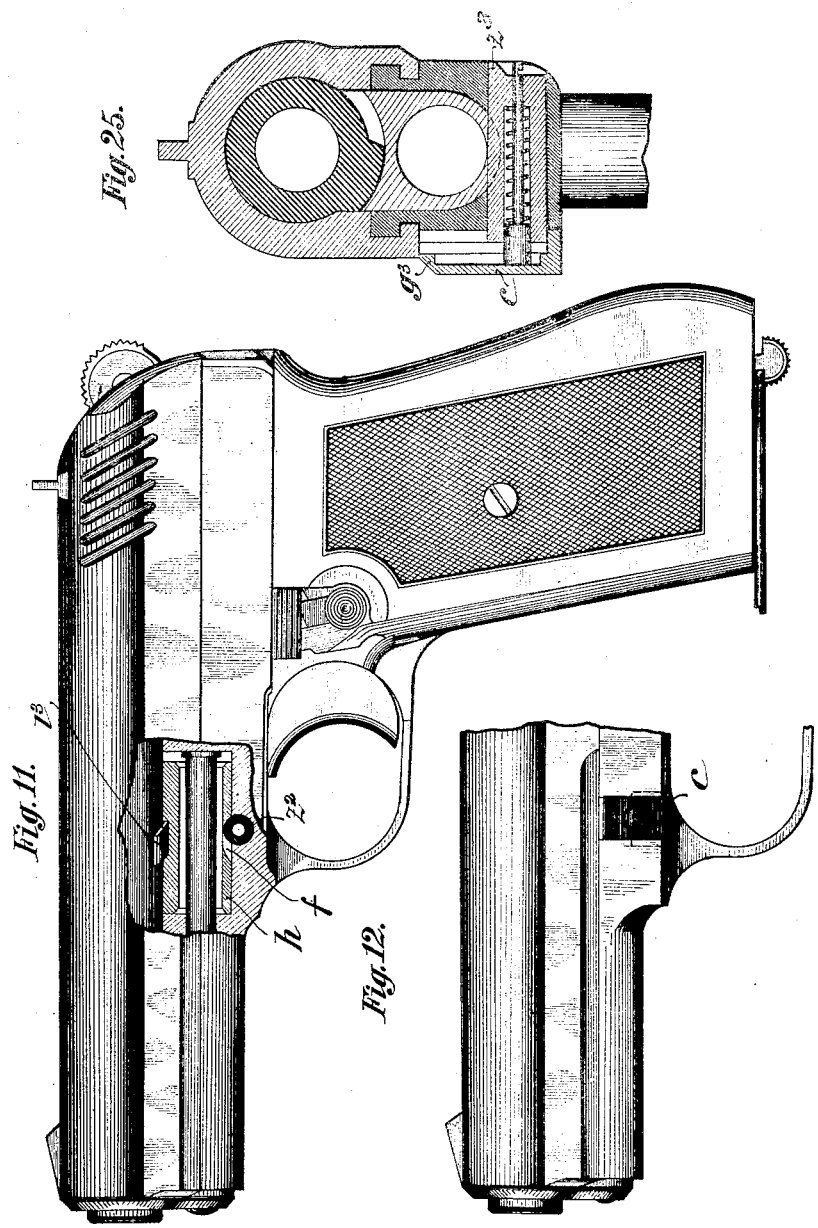
Inventor:
Josef Nickl
By [signature]
Attorney

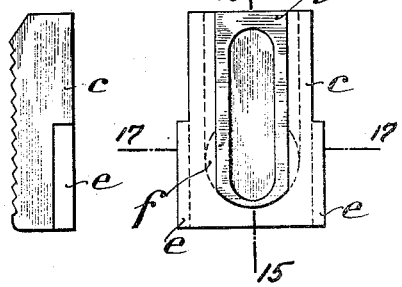
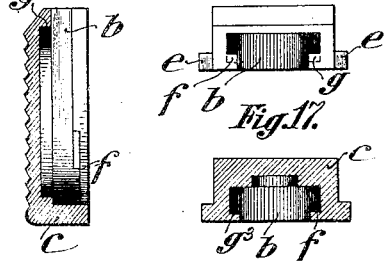

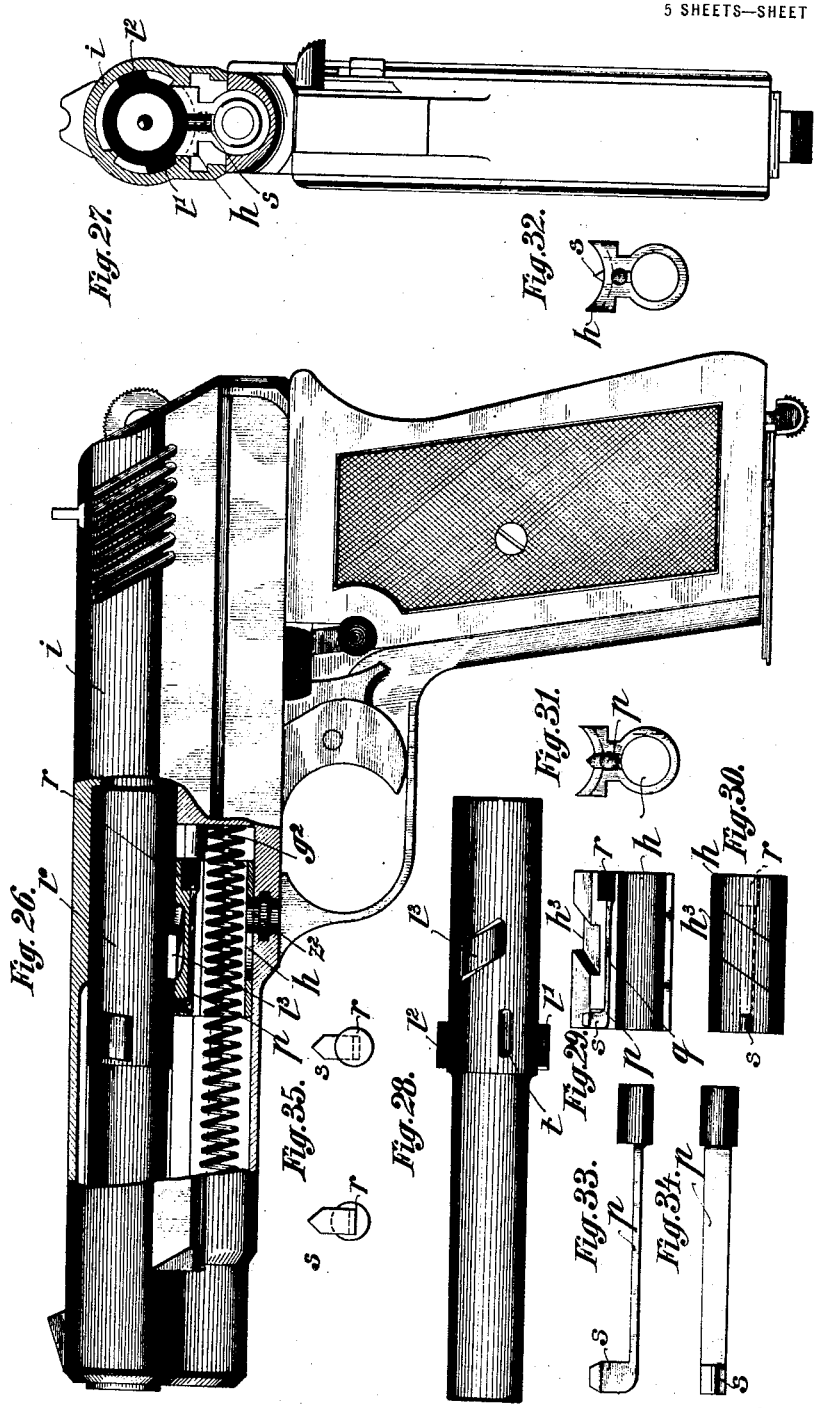

Patented Sept. 5, 1922.

1,427,966

UNITED STATES PATENT OFFICE.

JOSEF NICKL, OF OBERNDORF-ON-THE-NECKAR, GERMANY, ASSIGNOR TO WAFFEN-FABRIK MAUSER, AKTIENGESELLSCHAFT, OF OBERNDORF-ON-THE-NECKAR, GERMANY.

RECOIL-LOADING PISTOL.

Application filed June 16, 1921. Serial No. 478,208.

*To all whom it may concern:*

Be it known that I, JOSEF NICKL, a citizen of the German Republic, residing at No. 8 of Hauptstrasse, in the city of Oberndorf-on-the-Neckar, Germany, have invented certain new and useful Improvements in Recoil-Loading Pistols (for which I have filed applications in Germany, August 30, 1915, Patent No. 300,159; April 7, 1916, Patent No. 300,160, and May 15, 1917, Patent No. 301,605; France, March 31, 1921, Patent No. 533,143; Belgium, March 31, 1921; Spain, March 30, 1921, Patent No. 77,641; Sweden, March 23, 1921; Italy, March 29, 1921, all in the name of the firm Waffenfabrik Mauser, Aktiengesellschaft, of Oberndorf-on-the-Neckar, Germany, with my knowledge and consent, and for which I have also filed applications in Austria, August 28, 1916, Patent No. 79,078; Hungary, August 29, 1916, Patent No. 76,158, and February 3, 1920; Turkey, September 10, 1918; Czecho-Slovakia, January 29, 1920, Patent No. 1,862, and February 20, 1920, Patent No. 4,798; Rumania, March 23, 1920; Poland, March 27, 1920; Jugo-Slavia, March 30, 1921 (Case I), and March 30, 1921 (Case II)), of which the following is a specification.

Recoil-loading pistols are known in which the barrel, with the breech locked, recoils after firing a short distance in rectilinear direction and, at the end of such movement, undergoes a rotary motion in order to be unlocked. Projections or ribs on the barrel co-acting with recesses or grooves of the breech or the like are usually provided for the locking purpose, while a nose or lug on the barrel engaging a stationary inclined guide-way or a curved groove is provided to cause the barrel to rotate for the purpose above mentioned.

My invention relates to certain improvements in or in connection with a breech-mechanism of the above kind and the object of my invention is to provide a pistol of the above type, wherein the "gear" or "motion" for imparting to the barrel the aforesaid rotary displacement comprises a guiding boss or lug on the barrel engaging a curve-faced groove of the member or bearing which is mounted in the grip-stock and capable of axial displacement and which after firing runs back a short distance in order to bring about the rotation of the barrel.

A further object of my invention is to provide a mechanism, in which the suitably curved side faces of the said guiding lug on the barrel alternately engage with guiding ribs on the inner wall of the breech slide in order to limit the rotary movement of the barrel. An advantage thereof resides in the fact that the guiding faces of the lug are not exposed to any direct thrust or shock-action at firing and the barrel is always suitably and correctly rotated, guided and stopped without ever becoming loose, even in case of excessive use and of a large calibre of the pistol. For that reason the new breech mechanism is also adapted for use in pistols of largest calibre and of a small handy size, without affecting or impairing the precision of the shot, the proper and correct working or operating of the movable parts and the length of the life of the pistol.

A further object of my invention is to provide a mechanism in which the displacement of the bearing or guiding member co-operating with the said guiding lug is limited, on the one hand, by one end on said guiding member running against a shoulder of the grip-stock and, on the other hand, by a guiding pin or stud of particular shape and arrangement engaging with the guiding member.

A still further object of my invention is to provide a mechanism of the kind described in which the said guiding pin or stop is connected with a slide adapted to be slipped in or inserted into the grip-stock in such a manner that the said slide, when fully slipped in, acts to lock the guiding pin and at the same time or in turn is locked by the latter so as to be prevented from any accidental displacement. In a construction of this kind the guiding pin acting as a stop may be arranged to extend across over the full width of the grip-stock and to thus afford relatively large faces for the impact of the said bearing or guiding member, whereby any jolting or up-setting at firing is avoided. Moreover the pin or stud is thereby prevented from slipping out accidentally notwithstanding the fact that the construction permits the pin to be easily taken out and, therefore, the pistol to be readily dismounted. To this end the pin or stud is provided with projections or ears at one end engaging an undercut groove of the said slide, a spring being provided to keep the parts under tension. The said groove or grooves are enlarged or recessed at one end in such a manner that the pin's ears when upon displacement the parts assume a certain position relatively to each other, can leave the groove or grooves, entering at the same time the recessed part of the latter, so that both the slide and the pin are firmly connected with each other and cannot be separated or displaced relatively to each other. This connected relation of the two parts exists at the time when the slide is fully slipped in or inserted into its receiving grooves in the grip-stock. As the locking lugs on the barrel are provided with working faces of a relatively high or steep pitch acting for automatic locking, the barrel and the breech-slide are normally not unlocked prior to the guiding member striking against the stationary stop or abutment for limiting the stroke of the said member.

It happens sometimes that the run of the guiding member after firing is impeded by some obstacle, such as sand or the like, and the barrel and breech-slide are untimely unlocked thereby so that the pistol is liable to be soiled by the powder gases. In order to do away with this inconvenience, the guiding member is further provided with a resilient locking means, such as a catch-spring, which, when the pistol is locked, engages in a slot of the barrel to lock the same and cannot be released therefrom unless the pistol is positively locked under the co-operation of the guiding member striking against the stationary shoulder of the grip-stock acting to stop the stroke of the guiding member in rearward direction.

In the accompanying drawings, which are intended merely to illustrate a practical embodiment of the principles of my invention without limiting the scope of the same to the construction shown.

Figure 1 is a longitudinal sectional view of the pistol with the breech locked,

Figure 2 is a vertical cross-section on the line 2—2 of Figure 1,

Figure 3 is a view similar to Figure 1 with the breech unlocked and the breech slide in its rear position, Figure 4 is a vertical section on the line 4—4 of Figure 3, Figures 5 and 5ª are detail views showing the guiding boss or lug in alternate positions with regard to the wall of the breech-slide.

Figures 6 and 7 show the barrel alone in side view and front view respectively,

Figures 8, 9 and 10 are side, top plan and front views, respectively of the guiding member or bearing with the guiding track or groove.

Figures 11 to 25 are different views of a recoil-loading, hammer-operated pistol and of the stopping or abutting pin connected with a slide; in particular, Figure 11 is an elevation of the pistol partially in section, Figure 12 is an elevation of the muzzle-end of the pistol, showing the slide over the abutting pin in front view, Figures 13 and 14 show a side view and a front view of the slide, and Figure 15 shows a section on line 15—15 of Figure 14.

Figure 16 is an end view of the slide,

Figure 17 a section on the line 17—17 of Figure 14, Figures 18 and 20 are top views of the slide and the pin, showing the two parts interlocked and released.

Figures 19 and 21 are side views thereof,

Figures 22 to 24 are cross-sections of the pistol on an enlarged scale and with the parts shown in the preceding figures in different relative positions, Figure 25 is a similar cross-sectional view showing a modification of the pin arrangement, Figures 26 to 35 are views of the arrangement of the catch-spring in connection with a recoil-loading, hammer-actuated pistol; in particular, Figure 26 is an elevation of the pistol with certain parts broken away, Figure 27 is a cross-section thereof.

Figure 28 is an illustration of the barrel alone, seen from below,

Figures 29 to 32 are a longitudinal section, a top view and two end views, respectively, of the guiding member with the guiding groove, and Figures 33 to 35 are a side view, a top view and two end views respectively of the catch-spring.

In the constructions shown the locking lugs or bosses $l^1$ and $l^2$ are located diametrically opposite each other near the front end of the rear part $l^0$ of the barrel $l$ which has a greater diameter than the front part thereof, while the guiding lug or boss $l^3$ is located farther back about in the middle of the part $l^0$ and in the middle between the two lugs $l^1$ and $l^2$ taken circumferentially. Corresponding to the locking lugs $l^1$ and $l^2$ wide grooves $i^1$ and $i^2$ are cut out in the inner wall or face of the breech-slide $i$, the frontal end faces of said grooves acting as abutments for the locking lugs when the breech is closed. In connection with these cylindrical grooves $i^1$, $i^2$ longitudinal grooves $j^1$ and $j^2$ are provided leading into the said grooves $i^1$ and $i^2$ and extending therefrom as far as the front end of the breech-slide so as to allow the locking lugs, when unlocked, to freely pass therethrough at the return movement of the breech-slide. Locking and unlocking are brought about in the known manner by positively imparting to the barrel through the engagement of its guiding lug in a correspondingly shaped groove or bearing, a rotation in forward direction and a rotation in backward direction, whereby the locking lugs are caused to either enter the grooves $i^1$ and $i^2$ or, in leaving same, enter the longitudinal grooves $j^1$ and $j^2$.

In the constructions shown in Figures 1 to 10 of the drawings the locking lugs have bevelled or inclined engaging faces and the bevel or inclination thereof is in accordance with a thread face of a relatively low pitch acting for automatic locking whereas the guiding lug has a sufficiently high or steep pitch to afford an easy and ready unlocking, especially in the event of manual operation.

In the extension $g^1$ of the grip-stock $g$ a bearing with a guiding track for the guiding lug $l^3$ is provided consisting of a member $h$, the lower sleeve shaped part $h^1$ of which lies in a bore of said extension $g^1$, the top part $h^2$ thereof having a curved guiding track or groove $h^3$ shaped to conform to the contour of the guiding lug $l^3$. The member $h$ is so arranged within said extension $g^1$ as to be displaceable in axial relation, the movements thereof in one direction being limited by the vertical face or shoulder $g^2$ of the grip-stock $g$ and the movements in the other direction being confined by a stud $z^2$ projecting from below into a slot $h^4$ in the sleeve $h^1$ of the guiding member $h$.

The operation is as follows: After firing, the guiding member $h$ and the barrel interlocked with the breech-slide recoil freely until the movement of the member $h$ is checked by the shoulder $g^2$; and while the member $h$ is stopped, the breech-slide continues to move backward and thereby causes the barrel to be unlocked owing to the angular rotation that is given to the barrel and the extent of which is to be determined in accordance with the calibre or bore of the pistol. As soon as, on the return movement of the breech-slide, the locking lugs arrive at the rear end of the longitudinal grooves $j^1$, $j^2$, the member $h$ is returned to its forward position by the impact of the breech located in the near part of the breech-slide; that is, the position in which the stud $z^2$ engages with the rear edge of the slot $h^4$ whereby the barrel is rotated to move back so far as to allow of the lugs entering the grooves $i^1$ and $i^2$ for the locking purpose. The rotary movements of the barrel in forward and backward directions are limited or controlled by the side faces of the guiding lug, in the one or the other position, engaging with the lower guiding ribs $i^3$ and $i^4$. The said side faces of the lug also act to positively guide the barrel on the recoil and return movements of the breech-slide.

The extent of the rotation of the barrel or the width of the guiding lug is so chosen that the lug does not engage with the corresponding rib and rotation is not stopped before the barrel end is tightly pressed against the front face of the breech. It is obvious that in this construction the barrel is, so to say, coupled with the breech under the action and control of a screw whereby a powerful and tight connection and closure are secured. On the other hand the uncoupling or opening of the closure is brought about without any sudden thrust or blow, as described, by allowing the locked system to perform, after firing owing to the movability of the guiding member $h$, an initial movement prior to the beginning of the unlocking operation. The reciprocal movability of the guiding member, though of a short stroke only, still renders the breech construction suitable and applicable in pistols of any calibre or bore and for cartridges of any practically desirable charge, the more so since the pitch of the guiding lug and of the locking lugs may be varied to comply with calibre and charge.

In the modification shown in Figures 11 to 25 the guiding member $h$ likewise has a guiding groove for the lug $l^3$ in its upper part and is subject to a reciprocal movement at firing. The bottom part of the member $h$ has a curved recess for the reception of the stud $z^2$. The latter is of cylindrical or pin shape and is mounted horizontally across the said recess, as shown in Figure 11. One end of the stud is cut out to provide ears $a$ lying within the undercut groove or grooves $b$ of the slide $c$. In a bore of the stud or pin $z^2$ there is a spring $d$ tending to force the stud or pin outwards away from the slide $c$. The groove $b$ is undercut at both sides and is enlarged or recessed at the end where the guiding ribs $e$ are provided, to form a circular recess $f$, so that the ears of the stud or pin $z^2$, when the parts are mutually displaced and the recess $f$ assumes a position in front of the said ears, are free to move outwards and engage in the recess $f$ and to come in contact with the ends of the groove walls that are interrupted by said recess $f$, see Figures 18 and 19. External stops may be provided to prevent the stud from protruding totally. By exerting a pressure on the stud towards the slide $c$ the ears $a$ are removed from the recess $f$ to again allow of a displacement of the parts, that is to say, the stud and the slide, the one with relation to the other one, the ears $a$ sliding in that event in the undercut groove. The arrangement of the parts is such that when the slide $c$ assumes the position shown in Figure 21, the stud $z^2$ may be readily introduced into the corresponding hole of the grip-stock, the guiding ribs $e$ of the slide being in that event below the corresponding groove in the grip-stock see Figure 24. If the slide then is moved upwards into the position shown in Figure 22, the stud is forced by the action of its spring $d$ outwards into the recess $f$ of the groove $b$ of the slide, see Figures 18, 19 and 22, so that the slide is secured against any displacement. The bore for the stud $z^2$ extends across the whole of the width of the grip-stock and the free end of the stud or pin projects a little bit or may be flush with the outer face of the grip-stock. To remove the stud or pin from the pistol it is only necessary to exert a pressure on the free end thereof in the direction of the arrow in Figure 23, whereupon the ears $a$ of the stud or pin will be positioned in front of the undercut parts of the groove $b$ in the slide, so that the latter can again be given the position shown in Figure 24. In this position the stud or pin can be easily removed from the pistol and the latter then is ready for dismounting.

Accidental separation of the slide from the stud or pin is prevented, when the parts are in the position illustrated by Figures 21 and 24 by the spring $d$ engaging with a shoulder $g^3$ of the slide. In lieu of a spring a spring-controlled stepped pin $z^3$, Figure 25 may be used. On the retraction of said pin $z^3$ the slide $z$ and the stud $z^2$ are readily separable.

In the modification shown in Figures 25 to 35 the guiding member $h$ has a guiding groove $h^3$ as before to engage over the guiding lug $l^3$ on the enlarged part $l^0$ of the barrel. The said member $h$ is provided with a longitudinal recess or groove $q$ and a catch spring $p$ is embedded in said groove having a cylindrical head $r$ fitted in the correspondingly shaped end of the grove $q$, so that the two ends of the spring are flush or approximately so with the end faces of the member $h$. The spring is prevented from longitudinal displacement within the member $h$ by the head $r$ and its nose $s$ engaging with corresponding shoulders in the grove $q$. The nose $s$ normally projects from the groove upwardly and engages in a slot $t$ in the barrel, when the pistol is locked, that is to say, when the locking lugs $l^1$, $l^2$ engage the corresponding annular grooves in the interior face of the breech-slide $i$ and the latter is interlocked with the barrel.

The lateral faces of the nose $s$ of the spring $p$ are bevelled to 45° to facilitate the alternate engaging and disengaging with respect to the slot $t$ in the barrel. The mechanism is arranged in such a manner that the catch-spring $p$ cannot be released or disengaged from the slot except by the positive unlocking of the barrel and breech-slide, that is to say, when the guiding member $h$ has finished its backward travel and is in engagement with the shoulder $g^2$ of the grip-stock. The spring $p$ again engages in the slot in the barrel when the breech-slide and the guiding member move in forward direction, that is to say, when the latter is stopped by the stud or pin $z^2$ and the barrel is rotated for the locking purpose. The catch-spring, however cannot be released or disengaged by accident due to sand, grit or the like entering the path of the barrel, so that the sand or the like cannot cause the barrel and the breech-slide to become unlocked and consequently cannot bring about a dirtying or choking of the pistol by powder gases.

What I claim to secure by Letters Patent is:

1. In a recoil loading pistol, the combination of a barrel, a grip-stock, a breech-slide guided on said grip-stock, a sliding means rotatably engaged with the barrel, and a stop for said sliding means, whereby the barrel is rotated on the stoppage of the sliding means.

2. In a recoil-loading pistol, the combination of a barrel, a grip-stock, a breech-slide guided on said grip-stock, a reciprocating guiding member mounted in a projecting part of said grip-stock a stop for said member and a lug on said barrel cooperative with the guiding member to effect rotation of the barrel on the stoppage of said member.

3. In a recoil-loading pistol, the combination of a barrel, a grip-stock, a breech-slide guided on said grip-stock, and normally locked to said barrel a reciprocating, curve-faced guiding member on said grip-stock, and a curve-faced lug on said barrel co-operating therewith, both the said member and the lug having co-acting faces of relatively high pitch.

4. In a recoil-loading pistol, the combination of a barrel, a grip-stock, a breech slide, a slidable guiding member in connection with said grip-stock, a lug on said barrel co-operating with the guiding member, a shoulder on the grip-stock for limiting the movement of the guiding member in one direction and a stud or pin in said grip-stock for stopping the guiding member at the other end of its travel.

5. In a recoil-loading pistol, the combination of a barrel, a grip-stock, a breech-slide, a slidable guiding member, a lug on the barrel co-operating with said guiding member, and a shoulder on the grip-stock and a stud or pin in said grip-stock for stopping the sliding member at either end of its travel, said sliding member having a slot in its bottom for the stud or pin to engage therein, said slot being of such a length as to determine the extent of the forward stroke of the said guiding member.

In a recoil loading pistol, a guiding member having a curve-faced top-part, provided with a curve-faced guiding groove, for the guiding lug of the barrel, and also having a cylindrical bottom part, provided with a longitudinal slot, for the abutting stud or pin of the grip-stock, substantially as specified and shown.

7. In a recoil-loading pistol, the combination of a barrel, a grip-stock, a breech-slide, a slidable guiding member mounted in said grip-stock, a lug on the barrel co-operating with the guiding member, a stud or pin for limiting the movement of said guiding member in one direction, and a slide in connection with said pin or stud adapted to be pushed into the grip-stock to lock the said pin or stud and in turn to be locked by the stud or pin.

8. In a recoil-loading pistol, a slide having an undercut groove, and a stud or pin having ears engaging said groove, said groove having a recessed or enlarged part for the reception of said ears in case of a certain mutual displacement of the parts, to lock the said parts in their assumed mutual relation, essentially as set forth.

9. In a recoil-loading pistol, a guiding member comprising a curve-faced top part provided with a curve-faced guiding groove for the guiding lug of the barrel, and also comprising a cylindrical bottom part provided with a slot for the abutting pin or stud of the grip-stock, and a resilient locking means carried by said member and engageable with the barrel; substantially as described.

10. In a recoil-loading pistol, a guiding member comprising a curve-faced top part provided with a curve-faced guiding groove for the guiding lug of the barrel, and also comprising a cylindrical bottom part provided with a slot for the abutting pin or stud of the grip stock, and a stationary catch-spring on said member engaging in a slot in the barrel when the pistol is locked.

11. A recoil-loading pistol, including a barrel, a grip-stock, a breech-slide guided on said grip-stock, and means for causing the barrel to rotate after a short movement in axial direction, said means comprising a curve-faced lug on the barrel, a curve-faced guiding-member provided with a slot, and an abutting stud or pin engaged in said slot.

12. A recoil-loading pistol including a barrel, a grip-stock, a breech-slide guided on said grip-stock, a reciprocating curve-faced guiding-member mounted in a projecting part of said grip-stock and provided with a slot, a correspondingly curve-faced lug on the barrel adapted to be guided by said member, a shoulder on said grip-stock to limit the backward stroke of the guiding member, and a stud or pin in the grip-stock projection engaging in said slot to limit the forward stroke of the guiding member.

13. A recoil-loading pistol, including a barrel, a grip-stock, a breech-slide guided on said grip-stock, a curve-faced lug on the barrel, and a reciprocating guiding member on said grip-stock co-operating therewith and having a curve-faced top-part provided with a guiding groove for the said barrel-lug and a cylindrical bottom part provided with a slot for an abutting stud or pin.

14. A recoil-loading pistol, including a barrel, a grip-stock, a breech-slide guided on the grip-stock, a curve-faced lug on the barrel, a reciprocating member co-operating therewith and having a curved top part provided with a curve-faced guiding groove for the said lug and a cylindrical bottom-part provided with a slot, a stud or pin engaging in said slot and having ears, and a slide having a groove for the reception of said ears.

15. A recoil-loading pistol, including a barrel, a grip-stock, a breech-slide guided on the grip-stock, a curve-faced lug on the barrel, a reciprocating guiding member co-operating therewith and having a curved top-part provided with a curve-faced guiding groove for the said lug and a cylindrical bottom part with a slot, a stud or pin engaging in said slot and having ears at one of its ends, a slide in connection with said stud or pin, and a resilient locking means in said guiding member.

16. A recoil-loading pistol, including a barrel, a grip-stock, a breech-slide guided on the grip-stock, a curve-faced lug on the barrel, a reciprocable guiding member co-operating therewith and having a curve-faced groove for the lug and a slot in its bottom, a stud or pin engaging in said slot and having two ears at one of its ends, a slide in connection with said stud or pin, and a catch-spring in said guiding member said barrel having a slot to receive the said spring when the pistol is locked.

17. A recoil-loading pistol, including a barrel, a grip-stock, a breech-slide guided on said grip-stock, a curve-faced lug on the barrel, a reciprocable guiding member having correspondingly curved faces to co-operate therewith and further having a slot in its bottom, a pin in the grip-stock engaging in said slot to limit the travel of the guiding member in one direction, a shoulder on the grip-stock to check the travel of said member in the other direction, a slide in connection with said pin, and a catch-spring in said guiding member, the barrel having a slot to receive the spring when the pistol is locked.

18. A recoil-loading pistol, including a barrel, a grip-stock, a breech-slide guided on said grip-stock, a curve-faced lug on the barrel, a reciprocating guiding member having correspondingly curved faces to engage therewith and also having a slot in its bottom, a pin in the grip-stock having ears at one of its ends and engaging in said slot to limit the travel of the guiding member in one direction, a shoulder on the grip-stock to confine the travel of the guiding member in the other direction, a slide in connection with said pin, and a catch-spring in said guiding member the barrel having a slot to receive the spring when the pistol is locked.

In testimony whereof I affix my signature in presence of two witnesses.

JOSEF NICKL.

Witnesses:
  FRIEDE KLAIBER,
  E. SCHLEICHER.